United States Patent [19]

El-Nokaly et al.

[11] Patent Number: 5,370,892
[45] Date of Patent: Dec. 6, 1994

[54] USE OF HYDROPHOBIC SILICA TO CONTROL OR PREVENT PASSIVE OIL LOSS

[75] Inventors: Magda El-Nokaly, Hamilton; Raymond L. Niehoff, West Chester, both of Ohio

[73] Assignee: The Procter & Gamble Company, Cincinnati, Ohio

[21] Appl. No.: 112,867

[22] Filed: Aug. 26, 1993

Related U.S. Application Data

[63] Continuation of Ser. No. 753,759, Sep. 3, 1991, abandoned.

[51] Int. Cl.$^5$ ............ A23D 9/00; A23L 1/307
[52] U.S. Cl. ............... 426/531; 426/601; 426/804; 426/560; 426/637
[58] Field of Search ........... 426/531, 601, 804, 560, 426/637

[56] References Cited

U.S. PATENT DOCUMENTS

| | | | |
|---|---|---|---|
| 3,669,681 | 6/1972 | Shoaf | 99/86 |
| 4,005,195 | 1/1977 | Jandacek | 424/180 |
| 4,005,196 | 1/1977 | Jandacek et al. | 424/180 |
| 4,103,038 | 7/1978 | Roberts | 426/601 |
| 4,375,483 | 3/1983 | Shuford | 426/330 |
| 4,605,563 | 8/1986 | Heine et al. | 426/607 |
| 4,652,458 | 3/1987 | Frost | 426/573 |
| 4,797,300 | 1/1989 | Jandacek | 426/607 |
| 4,834,991 | 5/1989 | Porcello et al. | 426/94 |
| 4,925,692 | 5/1990 | Ryan | 426/531 |

FOREIGN PATENT DOCUMENTS

| | | |
|---|---|---|
| 233856 | 8/1987 | European Pat. Off. . |
| 236288 | 9/1987 | European Pat. Off. . |
| 311154 | of 1989 | European Pat. Off. . |
| 352907 | of 1990 | European Pat. Off. . |

OTHER PUBLICATIONS

Product Information, Hydrophobic Fumed Silicas, Degussa Corporation, Teterboro N.J.
Vilotta et al., CRC Critical Reviews in Food Science and Nutrition, 23 (4), 289–321.

*Primary Examiner*—Joseph Golian
*Attorney, Agent, or Firm*—Katherine L. Stewart; Rose Ann Dabek; David L. Suter

[57] ABSTRACT

A nondigestible fat which comprises a liquid nondigestible oil having a complete melting point below about 37° C. and a sufficient amount of a hydrophobic silica to control passive oil loss of the liquid nondigestible oil is disclosed. This nondigestible fat is useful in the formulation of reduced calorie fat compositions useful as frying fats for obtaining reduced calorie foods, e.g. potato chips, french fries and other fat-containing foods. These fat compositions can also be used to provide reduced calorie cooking and salad oils that are clear at room temperature.

32 Claims, No Drawings

USE OF HYDROPHOBIC SILICA TO CONTROL OR PREVENT PASSIVE OIL LOSS

This is a continuation of Ser. No. 07/753,759, filed on Sep. 3, 1991 and abandoned on Aug. 26, 1993.

TECHNICAL FIELD

This invention relates to the control or prevention of passive oil loss of a nondigestible oil by adding a hydrophobic silica. This invention further relates to reduced calorie foods and clear cooking and salad oils using such combinations of nondigestible oil and hydrophobic silica.

BACKGROUND OF THE INVENTION

Nondigestible oils which are liquid at body temperature (i.e. at 98.6° F., 37° C.) have a tendency to collect as a liquid mass in the intestine. If these nondigestible oils are not adsorbed by other fecal matter in the intestine, they can pass through the anal sphincter as an oil. This failure to retain the nondigestible oil with the other fecal matter and its passage through the anal sphincter unchanged is referred to as "passive oil loss" (or alternatively as "anal leakage").

Several agents have been proposed for controlling or preventing passive oil loss of nondigestible oils. These agents include higher molecular weight or higher melting solid nondigestible materials, as well as longer chain saturated fatty acids, for example, stearic acid and palmitic acid, or digestible sources of such fatty acids. See, for example, U.S. Pat. No. 4,005,195 (Jandacek, 1977), which discloses the use of solid fatty acids or digestible sources of solid fatty acids; U.S. Pat. No. 4,797,300 (Jandacek et al, 1989) and European patent application 311,154 (Letton, 1989), which disclose the use of certain solid polyol polyesters; and European patent application 352,907 (Howard et al, 1990), which discloses the use of microfibrillated cellulose.

Some of the agents used to control or prevent passive oil loss provide a high level of solids at mouth temperature (e.g., 92° F., 33.3° C.) such that they taste waxy when ingested. Accordingly, intermediate melting polyol fatty acid polyesters have been developed to provide passive oil loss control, while at the same time reducing waxiness in the mouth. See European patent application 236,288 (Bernhardt, 1987) and European patent application 233,856 (Bernhardt, 1987). These intermediate melting polyol polyesters exhibit a unique rheology at body temperatures due to a matrix involving a minimum level of solids (e.g., about 12% or lower) that bind the remaining liquid portion. As a result, these intermediate melting polyol polyesters are sufficiently viscous and have a sufficiently high liquid/solid stability at body temperatures to control passive oil loss. An example of such intermediate melting polyol polyesters are those obtained by substantially completely esterified sucrose with a 55:45 mixture of fully hydrogenated (hardstock) and partially hydrogenated soybean oil fatty acid methyl esters. See Examples 1 and 2 of the above European patent applications.

Liquid nondigestible oils have also been suggested for use in clear cooking and salad oils. However, some of the agents added to these nondigestible oils to control passive oil loss can cause the resulting composition to be cloudy or opaque at room temperature, i.e. at about 70° F. (21.1° C.) or below, instead of clear. This problem of cloudiness or opaqueness can be particularly severe if the oil is stored at refrigerator temperatures, e.g., at about 40° F. (4.4° C.) or below. At refrigerator temperatures, in some formulations visible solids form that can precipitate out. Consumers usually object to cooking and salad oils having solids in them.

It has been discovered that adding hydrophobic silicas to a nondigestible oil not only prevents passive oil loss, but also provides a clear oil.

Silica materials have been added to oils to increase their viscosity. See, for example, U.S. Pat. No. 4,605,563 to Heine et al (1986). The viscosity of the oils is increased by adding from 1–10% of a high melting glyceride and from 2–10% of a highly dispersed pyrogenic silica having submicron particles.

In CRC Critical Reviews in Food Science and Nutrition, Vilotta et al, "Food Applications and the Toxicological and Nutritional Implications of Amorphous Silicon Dioxide", 23 (4), (289–321) the food uses of silicas are described. In addition to their use as suspending agents or thickening/thixotropic agents in oils, they can be added to foods for anti-caking and dispersion. See for example U.S. Pat. No. 4,375,483 issued to Shuford et al (1983) (salt dispersed in an oil), U.S. Pat. No. 4,834,991 issued to Porcello et al (1989) (filler cream), U.S. Pat. No. 4,652,458 issued to Frost et al (1987) (lipid composition), U.S. Pat. No. 4,103,038 issued to Roberts (1978) (synthetic egg), and U.S. Pat. No. 3,669,681 issued to Shoaf et al (1972) (fat for toaster pastry).

Silica has also been used as an anti-anal leakage (i.e. passive oil loss control) agent in a nonfat low calorie food composition in which part of the fat is substituted by a liquid siloxane polymer. See U.S. Pat. No. 4,925,692 to Ryan (1990) where anti-anal leakage agents such as stearic acid or silica are used to prevent leakage of the liquid siloxane through the anal sphincter.

It is an object of this invention to add hydrophobic silicas to a liquid nondigestible oil to control or prevent passive oil loss.

It is also an object of this invention to obtain reduced calorie potato chips and other fried, or fat-containing, low moisture foods that have passive oil loss control, yet have less waxiness and substantially unaltered flavor display.

It is yet another object of this invention to provide reduced calorie cooking and salad oils formulated from liquid nondigestible oils that have passive oil loss control, yet are clear at room temperature, and preferably are clear at refrigerator temperatures.

It is a further object to produce a non-digestible oil which can be used to replace from 10% to 100% of the oil in a high or low moisture foods without causing passive oil loss. These and other objects will be evident from the description herein.

SUMMARY OF THE INVENTION

The present invention relates to reduced calorie fat compositions which comprise:
 A. from about 10 to 100% of a nondigestible fat component comprising:
  (1) a liquid nondigestible oil having a complete melting point below about 37° C.; and
  (2) a sufficient amount of a hydrophobic silica to control passive oil loss of the liquid nondigestible oil; and
 B. from 0 to about 90% of a digestible triglyceride fat or oil.

These fat compositions can be used in all fat containing foods, e.g. as frying fats for obtaining reduced calorie foods. Potato chips, and other low moisture fat-containing foods, exhibit passive oil loss control, yet have a less waxy taste impression, comparable to those of potato chips fried in a 100% triglyceride oil. Reduced calorie cooking and salad oils that are clear at room temperature (i.e. at about 70° F., 21.1° C.) are also claimed.

DETAILED DESCRIPTION OF THE INVENTION

A. Definitions

By "nondigestible fat or oil" is meant that only about 70% or less of the fat or oil is digested by the body. Preferably, only about 20% or less of such fats or oils are digested.

By "digestible triglyceride fat or oil" is meant a triglyceride fat or oil that is substantially completely digested by the body. Typically, at least about 90% of such triglyceride fats or oils are digested. Monoglycerides and diglycerides can be present in this fat or oil.

As used herein, the term "comprising" means various components can be conjointly employed in the fat compositions of the present invention. Accordingly, the term "comprising" encompasses the more restrictive terms "consisting essentially of" and "consisting of".

All percentages and proportions used herein are by weight unless otherwise specified. All numerical ranges herein are approximations unless otherwise specified.

B. Reduced Calorie Fat Compositions

A key ingredient of the reduced calorie fat compositions of the present invention is a nondigestible fat component. This nondigestible fat component comprises from about 10 to 100% of the composition. Preferably, this nondigestible fat component comprises from about 35 to 100%, more preferably from about 50 to 100%, and most preferably from about 75 to 100%, of the composition. Higher levels of this nondigestible fat component result in reduced caloric value and total saturated fat levels of the foods.

1. Liquid nondigestible oil

Liquid nondigestible oils have a complete melting point below about 37° C. Usually, the nondigestible fat or oil comprises at least about 85% liquid nondigestible oil. Preferably, the liquid nondigestible fat comprises from about 85 to about 99%, more preferably from about 90 to about 99%, most preferably from about 94 to about 99% of the nondigestible fat.

Suitable liquid nondigestible edible oils for use herein include liquid polyol fatty acid polyesters (see U.S. Pat. No. 4,005,195 to Jandacek, issued Jan. 25, 1977); liquid esters of tricarballylic acids (see U.S. Pat. No. 4,508,746 to Hamm, issued Apr. 2, 1985); liquid diesters of dicarboxylic acids such as derivatives of malonic and succinic acid (see U.S. Pat. No. 4,582,927 to Fulcher, issued Apr. 15, 1986); liquid triglycerides of alpha-branched chain carboxylic acids (see U.S. Pat. No. 3,579,548 to Whyte, issued May 18, 1971); liquid ethers and ether esters containing the neopentyl moiety (see U.S. Pat. No. 2,962,419 to Minich, issued Nov. 29, 1960); liquid fatty polyethers of polyglycerol (See U.S. Pat. No. 3,932,532 to Hunter et al, issued Jan. 13, 1976); liquid alkyl glycoside fatty acid polyesters (see U.S. Pat. No. 4,840,815 to Meyer et al, issued Jun. 20, 1989); liquid polyesters of two ether linked hydroxypolycarboxylic acids (e.g., citric or isocitric acid) (see U.S. Pat. No. 4,888,195 to Huhn et al, issued Dec. 19, 1988); liquid esters of epoxide-extended polyols (see U.S. Pat. No. 4,861,613 to White et al, issued Aug. 29, 1989); all of which are incorporated herein by reference.

Preferred liquid nondigestible oils are the liquid polyol fatty acid polyesters that comprise liquid sugar fatty acid polyesters, liquid sugar alcohol fatty acid polyesters, and mixtures thereof, the sugars and sugar alcohols containing 4 to 11 hydroxyl groups (preferably from 4 to 8 hydroxyl groups) prior to esterification. The term "sugar" includes monosaccharides, disaccharides and trisaccharides. The term "sugar alcohol" refers to reduced sugars, i.e. in which the aldehyde or ketone group has been reduced to an alcohol.

Examples of suitable monosaccharides are those containing 4 hydroxyl groups such as xylose, arabinose, and ribose. Among 5 hydroxyl-containing monosaccharides that are suitable for use herein are glucose, mannose, galactose, and fructose. Suitable sugar alcohols are sorbitol, xylitol and erythritol. Examples of suitable disaccharides are maltose, lactose, and sucrose. Examples of suitable trisaccharides include raffinose and maltotriose. Preferred polyols for preparing liquid polyesters are selected from erythritol, xylitol, sorbitol, glucose and sucrose. Sucrose is especially preferred.

The liquid polyol fatty acid polyesters must contain at least 4 fatty acid ester groups. Polyol fatty acid polyester compounds that contain 3 or less fatty acid ester groups are digested in and the products of digestion are absorbed from the intestinal tract much in the manner of ordinary triglyceride fats, whereas the polyol fatty acid polyester compounds that contain 4 or more fatty acid ester groups are substantially nondigestible and consequently nonabsorbable by the human body. It is not necessary that all of the hydroxyl groups of the polyol be esterified with fatty acids, but it is preferable that the disaccharide polyols contain no more than 3 unesterified hydroxyl groups, and more preferable that they contain no more than 2 unesterified hydroxyl groups. Most preferably, substantially all of the hydroxyl groups of the disaccharide polyol are esterified with fatty acids, e.g., the liquid sucrose polyesters have from about 7 to 8 hydroxyl groups esterified.

The sugars or sugar alcohols are esterified with fatty acids containing from 2 to 24 carbon atoms, preferably from 8 to 22 carbon atoms, and most preferably from 12 to 22 carbon atoms. Examples of such fatty acids include acetic, butyric, caproic, caprylic, capric, lauric, myristic, myristoleic, palmitic, palmitoleic, stearic, oleic, elaidic, ricinoleic, linoleic, linolenic, eleostearic, arachidonic, behenic, brassidic and erucic acid. The fatty acids can be derived from naturally occurring materials or be synthetic fatty acids. Suitable sources of naturally occurring fatty acids include corn oil, cottonseed oil, peanut oil, soybean oil, canola oil, (i.e. low erucic acid rapeseed oil), sunflower seed oil, sesame seed oil, safflower oil, palm kernel oil, and coconut oil. The fatty acids can be saturated or unsaturated, including positional or geometrical isomers, e.g., cis- or trans-isomers, and can be the same for all ester groups, or, more typically, are mixtures of different fatty acids.

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated. Preferred unsaturated fatty acids in such liquid polyol polyesters are oleic acid, linoleic acid, and mixtures thereof. The following are nonlimiting examples of specific liquid polyol fatty acid polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose and raffinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol fatty acid polyesters suitable for use herein can be prepared by a variety of methods known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. See, for example, U.S. Pat. Nos. 2,831,854, 3,600,186, 3,963,699, 4,517,360 and 4,518,772, all of which are incorporated by reference, which disclose suitable methods for preparing polyol fatty acid polyesters.

Specific, but nonlimiting, examples of the preparation of liquid polyol fatty acid polyesters suitable for use in the practice of the present invention are as follows.

Erythritol tetraoleate: Erythritol and a five-fold molar excess of methyl oleate are heated at 180° C. under vacuum, with agitation, in the presence of sodium methoxide catalyst over two reaction periods of several hours each. The reaction product (predominately erythritol tetraoleate) is refined in petroleum ether and crystallized three times from several volumes of acetone at 1° C.

Xylitol pentaoleate: Xylitol and a five-fold molar excess of methyl oleate in dimethylacetamide (DMAC) solution are heated at 180° C. for five hours in the presence of sodium methoxide catalyst, under vacuum. During this time the DMAC is removed by distillation. The product (predominately xylitol pentaoleate) is refined in petroleum ether solution and, after being freed of petroleum ether, is separated as a liquid layer four times from acetone at about 1° C. and twice from alcohol at about 10° C.

Sorbitol hexaoleate is prepared by essentially the same procedure used to prepare xylitol pentaoleate except that sorbitol is substituted for xylitol.

Sucrose octaoleate is prepared by substantially the same procedure as that used to prepare erythritol tetraoleate except that sucrose is substituted for erythritol.

Sucrose hepta- and octaesters of soybean oil fatty acids: Soybean oil is partially hydrogenated to an iodine value of 107 and then converted to the respective methyl esters. These methyl esters are then reacted with sucrose in the presence of a potassium carbonate catalyst and the potassium soap of the soybean oil fatty acids.

Sucrose hepta- and octaesters of canola oil fatty acids: Canola oil is partially hydrogenated to an iodine value of 90 and then converted to the respective methyl esters. These methyl esters are then reacted with sucrose at about 135° C. in the presence of a potassium carbonate catalyst and the potassium soap of the canola oil fatty acids. See Example 1 of U.S. Pat. No. 4,517,360 to Volpenhein, issued May 14, 1985.

Sucrose hepta- and octaesters of palm kernel oil fatty acids: Palm kernel oil (hydrogenated to an iodine value of about 4) is converted to the respective methyl esters. These methyl esters are then reacted with sucrose at about 135° C. in the presence of a potassium carbonate catalyst and the potassium soap of the palm kernel oil fatty acids. See Example 1 of U.S. Pat. No. 4,517,360 to Volpenhein, issued May 14, 1985.

2. Hydrophobic silicas

The nondigestible fat component additionally comprises a hydrophobic silica. The hydrophobic silica is present in an amount sufficient to act as a passive oil loss control agent for the liquid nondigestible oil. What constitutes "a sufficient amount" would depend upon a variety of factors including silica particle size, surface area, nature of the lipophilic group on the surface and the degree of derivatization. Typically, at least about 0.5% hydrophobic silica is used. Usually from about 0.5% to about 15% hydrophobic silica, and preferably, from about 0.5% to about 10% hydrophobic silica, and most preferably from about 0.5% to about 6% hydrophobic silica is used in the non-digestible fat compositions. The food it is used in as well as the non-digestible fat composition itself will determine the exact level.

The hydrophobic silicas that are used herein are a very fine colloidal silicon dioxide which has been derivatized to make it hydrophobic. Preferably, the particles have an average diameter of less than about 50 nanometers, and usually are in the range of from about 7 to about 40 nanometers. Most preferably the particles are in the range of 7-30 nanometers. These particles have a surface area in the range of from about 50 to about 380m$^2$/g. The smaller particles are fumed silica. Spray drying can also be used to obtain hydrophobic silicas suitable for use herein.

Hydrophobic silicas are made from hydrophilic silica by chemically modifying the silanol groups (SiOH) on the surface, using halosilanes, alkoxysilanes, silazanes, and siloxanes. The silanes contain an organic group, e.g. alkyl, cycloalkyl or aryl group. These materials form a chemical bond on the surface of the silicon dioxide with a carbon, i.e. a carbons silicon bond is formed. The organic groups are substituted on the silica on the outer edge of the particle. The organic group can be any hydrocarbyl group selected from the group of $C_1$ to $C_8$ alkyl, cycloalkyl and aryl groups. The preferred organo groups are methyl, ethyl, propyl, butyl, cyclohexyl, phenyl benzyl and methylphenyl. Compositions such as

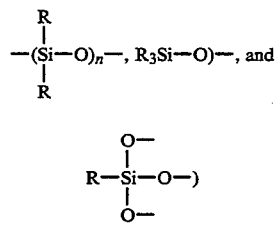

are all hydrophopic, R being a $C_1$ to $C_8$ alkyl, aryl or cycloalkyl group. Preferably R is methyl, ethyl or octyl and most preferably, R is methyl. Besides repelling water, hydrophobic silicas differ from the hydrophilic materials in having reduced water vapor absorption, and a reduced silanol group density. In general about 10% to 100% of the silanol groups are derivatized. Preferably at least 50% of the silanol groups are derivatized.

Suitable hydrophobic silicas are available from Degussa Corporation (Ridgefield Park, N.J.) under the trade names Aerosil. Other suitable hydrophobic silicas are produced by Cabot (Tuscola, Ill.) under the tradename Cab-O-Sil TS-530, TS-610 and TS-720.

The hydrophobic silica can be added to the liquid nondigestible oil by a simple mixing step. However, homogenization causes better dispersal of the hydrophobic silica into the oil and less clumping or settling occurs.

3. Optional solid polyol fatty acid polyester or triglyceride passive oil loss control agents Hydrophobic silicas can be used as the sole passive oil loss control agent. However, when used at a sufficiently high level (e.g., at least about 5% to 10% of the nondigestible fat component), these hydrophobic silicas can cause substantial thickening (i.e. higher viscosities) in the liquid nondigestible oil. The degree of thickening is dependent on the particle size, nature of the lipophilic alkyl group derivatized to the surface, and the extent of derivatization (i.e. the remaining silanol group density). Because silica particles do not melt at frying temperatures (e.g. 350° F.–400° F.) the viscosity of the liquid nondigestible oil containing these hydrophobic silicas may be too high for optimal heat and mass transport during frying and fat drainage away from the food after frying.

When used in applications, such as frying, where low viscosity during and immediately after cooking is important, it can be desirable to use a mixture of the hydrophobic silica with solid polyol fatty acid polyester or triglyceride passive oil loss control agents. The solid polyol fatty acid polyester or triglyceride will melt during the frying process, lowering the viscosity of the oil during and after frying. This improves heat and mass transport during frying and drainage after frying.

On a nondigestible fat component basis, these mixtures typically comprise from about 0.5% to about 10% hydrophobic silica and from about 0% to about 10% solid polyol polyester or solid triglyceride. Preferably, these mixtures comprise from about 0.5% to about 6% hydrophobic silica and from about 0% to about 6% solid polyol polyester or triglyceride, more preferably from about 0.5% to about 4% hydrophobic silica and from about 0% to about 5% solid polyol polyester or triglyceride, most preferably from about 0.5% to about 3% hydrophobic silica and from about 0.5% to about 5% solid polyol polyester or solid triglyceride.

The solid polyol fatty acid polyesters useful herein are solid at temperatures of about 37° C. and above. Preferably they are solid at about 50° C. and higher, and most preferably at about 60° C. or above. (Melting points reported herein are measured by Differential Scanning Calorimetry (DSC)). Solid polyol polyesters can bind edible liquid nondigestible oils and can be utilized at relatively low levels in combination with the hydrophobic silicas to control or prevent the passive oil loss of nondigestible oils.

The solid polyol fatty acid polyesters useful in the present invention comprise a polyol having at least 4 (preferably from 4 to 11, more preferably from 4 to 8, most preferably 6 to 8) hydroxyl groups which have been esterified with certain fatty acid ester groups. Suitable polyols include sugars, sugar alcohols, alkyl glycosides, pentaerythritol, polyglycerols such as diglycerol and triglycerol and polyvinyl alcohols. Examples of suitable monosaccharides, disaccharides and trisaccharides include those previously defined for the liquid polyol polyesters, with sucrose being a particularly preferred polyol. Sucrose octaesters of $C_{18}$–$C_{22}$ fatty acids can be used.

The preferred solid polyol fatty acid polyesters contain ester groups comprising a combination of: (a) long chain unsaturated fatty acid radicals, short chain saturated fatty acid radicals or mixtures thereof; and (b) at least about 15%, preferably at least about 30%, more preferably at least about 50%, most preferably at least about 60%, long chain saturated fatty acid radicals. Suitable unsaturated fatty acid radicals contain at least 12, preferably from 12 to 26, more preferably from 18 to 22, most preferably 18, carbon atoms. Suitable short chain saturated fatty acid radicals contain from 2 to 12, preferably from 6 to 12, and most preferably from 8 to 12, carbon atoms. Suitable long chain saturated fatty acid radicals contain at least 20, preferably from 20 to 26, most preferably 22, carbon atoms. The long chain unsaturated fatty acid radicals can be used singly or in mixtures with each other, in all proportions, as is also the case with the short chain and long chain saturated fatty acid radicals.

The molar ratio of long chain unsaturated fatty acid radicals or short chain saturated fatty acid radicals or mixtures thereof, to long chain saturated fatty acid radicals, is from about 1:15 to about 2:1. Preferably, this molar ratio is from about 1:7 to about 5:3, most preferably from about 1:7 to about 3:5. The average degree of esterification of these solid polyol fatty acid polyesters with these mixtures of fatty acid radicals is such that at least 4 of the hydroxyl groups of the polyol are esterified. In the case of solid sucrose polyesters, from about 7 to 8 of the hydroxyl groups of the polyol preferably are esterified. Typically, substantially all (e.g., at least about 85%, preferably at least about 95%) of the hydroxyl groups of the polyol are esterified.

Examples of suitable long chain unsaturated fatty acid radicals are lauroleate, myristoleate, palmitoleate, oleate, elaidate, erucate, linoleate, arachidonate, linolenate, eicosapentaenoate, and docosahexaenoate. In terms of oxidative stability, the monounsaturated and diunsaturated fatty acid radicals are preferred. Examples of suitable short chain saturated fatty acid radicals are acetate, butyrate, hexanoate, octanoate, decanoate, and dodecanoate. Examples of suitable long chain saturated fatty acid radicals are eicosanoate, docosanoate, tetracosanoate, and hexacosanoate.

Mixed fatty acid radicals from oils which contain substantial amounts of the desired fatty acids can be used as sources of fatty acid radicals in preparing the solid polyol polyesters useful in the present invention. For example, palm kernel oil can be used as a source of pure saturated fatty acids having from 8 to 12 carbon atoms; rapeseed oil fatty acids or soybean oil fatty acids can be used as a mixture monounsaturated and polyunsaturated fatty acids having 12 to 26 carbon atoms, and hardened (i.e., hydrogenated) high erucic rapeseed oil fatty acids can be used as a source of long chain saturated fatty acids having from 20 to 26 carbon atoms. High oleic sunflower oil can also be used.

Examples of solid polyol fatty acid polyesters useful in the present invention include sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or di-unsaturated fatty acid radicals and behenic fatty acid radicals in a molar ratio of unsaturated:behenic acid radicals of about 1:7 to 3:5.

The solid polyol fatty acid polyesters can be made by known methods. One method is by reacting acid chlorides or acid anhydrides of the respective fatty acids with sucrose, preferably using a sequential esterification process. See U.S. application Ser. No. 417,990, to James C. Letton, filed Oct. 6, 1989 (herein incorporated by reference), which discloses this sequential esterification process.

Another method for preparing these solid polyol polyesters is by the process of reacting the methyl esters of the respective fatty acids with sucrose in the presence of a fatty acid soap and a basic catalyst such as potassium carbonate. See, for example, U.S. Pat. No. 3,963,699 to Rizzi et al, issued Jun. 15, 1976, U.S. Pat. No. 4,518,772 to Volpenhein, issued May 21, 1985, and U.S. Pat. No. 4,517,360 to Volpenhein, issued May 14, 1985, all of which are incorporated by reference. When using the methyl ester route for preparing the solid polyol polyesters having mixed short chain and long chain saturated fatty acid radicals, the octaester of one of the types of fatty acids (i.e., short chain saturated fatty acids, or long chain saturated fatty acids) can be prepared first, followed by partially interesterifying this initial reaction product with the methyl ester of the other type of fatty acid. Preferably, the methyl esters of the long chain saturated fatty acids are reacted with sucrose in a first stage at about 135° C. to obtain partial esters of sucrose. The methyl esters of the short chain saturated fatty acids are then added to the reaction and the temperature is dropped to 90°-120° C., as necessary, and reflux is maintained by adjusting pressure and/or temperature to keep the methyl esters of the short chain fatty acids in the reactor.

When using the methyl ester route to prepare solid polyol polyesters having mixed long chain unsaturated and saturated fatty acid radicals, the unsaturated and saturated methyl esters are blended in the desired ratio and reacted with sucrose by transesterification to obtain the sucrose esters of mixed unsaturated/saturated fatty acids. In a preferred way of practicing this process, five moles of the blended saturated/unsaturated methyl esters are reacted with sucrose in a first stage at 135° C. to obtain partial esters of sucrose. An additional nine moles of the blended esters are then added and the reaction continued at 135° C. under reduced pressure until the desired degree of esterification has been reached.

Preferred solid polyol polyesters are sucrose tetrabehenate tetracaprylate made by sequential esterification of sucrose with behenyl acid chloride followed by capryl chloride, sucrose pentabehenate trilaurate made sequentially from the methyl esters using potassium stearate as a catalyst, and sucrose tetraoleate tetrabehenate made by reacting behenyl chloride with sucrose and then reacting the tetrabehenate with oleyl chloride. Another preferred material is made by hydrogenating a blend of high and low euric acid rapeseed and cottonseed oil to an Iodine Value of 4. The hydrogenated oils are converted to the methyl esters. The methyl esters of sunflower oil are mixed with the saturated fatty acid esters (about 1:5 sunflower:rapeseed/cottonseed) and then sucrose is esterified with the mixture using a soap of hydrogenated soybean oil as a catalyst.

4. Digestible Triglyceride Fat or Oil

In addition to the nondigestible fat component, the reduced calorie fat compositions of the present invention can optionally include a digestible triglyceride fat or oil. Generally, fat compositions of the present invention can comprise from 0 to about 90% of such triglyceride fats or oils. Preferably, the fat compositions of the present invention comprise from 0 to about 65%, more preferably from 0 to about 50%, and most preferably from 0 to about 25%, of such triglyceride fats or oils. Because of the potential caloric impact of these triglyceride fats and oils and their saturated fat content, it is desirable to minimize the level at which they are included in the fat compositions.

As used herein, the term "triglyceride oil" refers to triglyceride compositions which are fluid or liquid above about 25° C. The triglyceride oils can include those which are fluid or liquid below 25° C. (solid triglycerides) and can also include mono- and diglycerides at levels up to 30%. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids may be hydrogenated to maintain flavor, but care should be taken not to greatly increase the level of glycerides melting above 25° C.

As used herein, the term "triglyceride fat" refers to those triglyceride compositions which are solid or plastic above about 25° C. These solid or plastic fats can be derived from plants or animals or can be edible synthetic fats or oils. Animal fats such as lard, tallow, oleo oil, oleo stock, oleo stearin and the like can be utilized. Unsaturated vegetable oils can be converted into plastic fats by partial hydrogenation of the double bonds of fatty acid constituents followed by conventional chilling and crystallization techniques or by proper mixture with sufficient triglycerides which are solid at room temperature to form a rigid interlocking crystalline structure which interferes with the free-flowing properties of the liquid oil. See U.S. Pat. No. 3,355,302 to Purves et al, issued Nov. 28, 1967, and U.S. Pat. No. 3,867,556 to Darragh et al, issued Feb. 18, 1975 (herein incorporated by reference), for further examples of solid or plastic fats. The inclusion of solid fats can cause adverse effects on the organoleptic properties, in particular waxiness and flavor display, of fried foods and thus they should be limited.

Triglyceride fats and oils useful in the fat compositions of the present invention can include triglycerides in which one or more of the hydroxyls is esterified with a low molecular weight fatty acid, i.e., acetyl, propionyl, butyryl, caproyl, caprylyl, or capryl radicals. Usually the remaining hydroxyl groups (if any) are esterified with acyl radicals of saturated or unsaturated fatty acids having from 12 to 24 carbon atoms.

5. Other Optional Compounds

Various other ingredients typically included in fat products can also be included in the reduced calorie fat compositions. Stabilizers to help protect against oxidative deterioration at high temperatures can be used. Silicone oils, particularly methyl and ethyl silicone oils, are useful for this purpose. Methyl silicones have also proven effective in reducing the rate of oil polymerization during frying. Other additives include minor amounts of optional flavorings, emulsifiers, anti-spattering agents, anti-sticking agents, antioxidants or the like.

The fat compositions of the present invention can also be fortified with vitamins and minerals, particularly the fat-soluble vitamins. Fat-soluble vitamins include vitamin A, vitamin D, and vitamin E. See U.S. Pat. No. 4,034,083 to Mattson (herein incorporated by reference) which discloses fat-soluble vitamins useful in fortifying polyol fatty acid polyesters.

Noncaloric or reduced calorie sweeteners alone or in combination with bulking agents can be added. These noncaloric or reduced calorie sweeteners include, but are not limited to, aspartame, saccharin, alitame, thaumatin, dihydrochalcones, acesulfame, and cyclamates.

Bulking or bodying agents which can be useful include partially or wholly nondigestible carbohydrates, for example, polydextrose and cellulose or cellulose derivatives, such as carboxymethylcellulose, carboxyethylcellulose, hydroxypropylcellulose, methylcellulose, hydroxypropyl methylcellulose, and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose and substituted carbohydrates such as 5-C-hydroxy-methyl hexose and related compounds.

The fat compositions of the present invention can include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of cellulosic fiber are vegetables, fruits, seeds, cereals, and man-made fibers (for example, by bacterial synthesis). Commercial fibers such as purified plant cellulose, or cellulose flour, can be used. Naturally occurring fibers, such as psyllium and fibers from whole citrus peel, citrus albedo, sugar beets, citrus pulp and vesicle solids, apples, apricots, and watermelon rinds can be included.

These dietary fibers can be in a crude or purified form, be of a single type, a composite dietary fiber, or some combination of fibers. The fibers are processed by methods known to the art.

C. Uses of Reduced Calorie Fat Compositions

The reduced calorie fat compositions of the present invention can be used as a partial or total replacement for normal triglyceride fat in any fat-containing food product comprising fat and nonfat ingredients to provide reduced calorie benefits without passive oil loss. In order to obtain a significant reduction in calories, at least about 10%, and preferably at least about 50%, of the total fat in the food product comprises the reduced calorie fat composition. Very low calorie and lower saturated fat food products are obtained when the total fat comprises up to 100% of the reduced calorie fat composition.

These compositions are useful in a wide variety of food and beverage products. For example, they can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good include breads and rolls, crackers, pretzels, pancakes, waffles, ice cream cones and cups, yeast-raised baked goods, pizzas and pizza crusts, baked farinaceous snack foods, and other baked salted snacks.

In addition to their uses in baked goods, the reduced calorie fat compositions can be used alone or in combination with other regular, reduced calorie or zero calorie fats to make shortening and oil products. The other fats can be synthetic or derived from animal or vegetable sources, or combinations of these. Shortening and oil products include, but are not limited to, shortenings, margarines, spreads, butter blends, lards, cooking and frying oils, salad oils, popcorn oils, salad dressings, mayonnaise, and other edible oil products.

The reduced calorie fat compositions of the present invention are particularly useful in the preparation of reduced calorie potato chips and other low moisture, fat-containing foods. As used herein, the term "low moisture food" refers to a food having nonfat ingredients (e.g. carbohydrates, protein, etc.) and having an end product moisture content typically of about 10% or less, preferably about 5% or less, more preferably about 3% or less, most preferably about 2% or less, i.e. is typically crisp. This end product moisture content can be achieved before or after treatment with the fat composition. For example, in the case of potato chips, this moisture content would be achieved as a result of frying in the fat composition. The fat compositions of the present invention can be applied to the exterior surface of these low moisture foods (i.e., fat-coated foods), incorporated into the interior thereof, such as in the case of mixing with the other food ingredients, or incorporated into the food, followed by application to the exterior surface thereof.

As used herein, the term "fat-coated foods" refers to foods prepared by applying the fat compositions of the present invention to all or a portion of the surface thereof. These fat compositions can be applied by a variety of means including immersing, dipping, soaking, spraying, blowing, pouring, pan coating (e.g., in a revolving pan), tumble coating, brushing, applying with a roller, rolling around in a container of fat composition, falling film methods, enrobing and curtain coating. The fat composition can be heated during application to the food, such as in the case of frying. If desired, the fat compositions of the present invention can be applied to the surface of the food, followed by heating, such as baking, steaming or other cooking methods. The fat composition can also be applied to the surface of a food which already contains fat. Once applied to the surface, the fat composition is typically absorbed into the interior of the food, such as in the case of potato chips or french fries, corn chips and tortilla chips. On french fries the fat stays at or near the surface.

The fat compositions of the present invention are particularly useful in the preparation of fried foods such as fried snacks, e.g. potato chips or french fries. The foods are immersed in a fat composition heated to the appropriate temperature, for an appropriate period of time. The particular temperatures and times for frying will depend on the particular food that is involved, the desired final moisture content, product appearance, texture and amount of absorbed fat. In the case of potato chips, potato slices or fabricated potato pieces are immersed in a fat composition at a temperature of from about 300° to about 400° F. (from about 148.9° to about 204.4° C.), preferably from about 340° to about 400° F. (from about 171.1° to about 204.4° C.), most preferably from about 350° to about 380° F. (from about 176.7° to about 193.3° C.), for a period of time sufficient to achieve a final moisture content of about 3% or less. Corn chips or tortilla chips are usually immersed in a fat composition at a temperature of from about 350° to about 420° F. (from about 176.7° to about 215.6° C.), preferably from about 370° to about 410° F. (from about 187.8° to about 210° C.), for a period of time sufficient to achieve a final moisture content of about 3% or less. To provide improved drainability, the fat compositions used for frying preferably comprise a nondigestible fat component and a mixture of hydrophobic silica and solid polyol fatty acid polyesters as previously described. This aids in heat transfer and improved draining. In addition, post fry fat removal processes, such as blowing hot air or nitrogen through a bed of chips or steam stripping of the fried chips, can be used to remove some of the fat from the fried food surface.

The fat compositions of the present invention are particularly useful in the preparation of potato chips from either potato slices or fabricated potato pieces. Fabricated potato pieces refers to potato pieces obtained from a dough formed from mashed potatoes or from dried potatoes in the form of flakes and/or granules to which water and, optionally an emulsifier, has been added. Fried or baked salted snacks such as corn chips, tortilla chips, potato sticks, popcorn, nuts, sweet snacks, corn curls and corn puffs, pellet snacks, half products, and other extruded snacks based on corn or other cereal grains such as wheat, rice, and the like can be made with these fats.

The reduced calorie fat compositions of the present invention are also particularly useful in providing reduced calorie cooking and salad oils. These oils have good passive oil loss control and yet are clear at room temperature. The extremely small particle size of the hydrophobic silica (7–40 nanometers) and the fact that its refractive index is similar to liquid oils, provides the optical clarity.

The reduced calorie cooking and salad oils of the present invention are pourable products, i.e. have a yield point of about 100 dynes/cm$^2$ or less and a fluidity at 21° C. of at least about 15 gm/30 second, or preferably at least about 25 gm/30 second in the case of salad oils, and have an optical turbidity of about 200 NTU or less, and preferably about 50 NTU or less, and most preferably less than 10 NTU. These reduced calorie cooking and salad oils typically comprise from about 10% to about 100% nondigestible fat component, and from about 0% to about 90% digestible triglyceride fat or oil and from 0.5% to 10% hydrophobic silica. Preferably, these cooking and salad oils comprise from about 35% to about 100% nondigestible fat component and from about 0% to about 65% digestible triglyceride fat or oil, and most preferably from about 60% to about 100% nondigestible fat component and from about 0% to about 40% digestible triglyceride fat or oil.

Other uses for the reduced calorie fat compositions of the present invention include partial or complete replacement of triglyceride fat and/or oils present in peanut butter, frozen desserts such as ice cream and ice cream coatings, whipped toppings, frosting products, processed meat products, including vegetable protein-based meat analog products, sauces, gravies, and dairy products such as milkshakes, milk products, coffee whiteners, chocolate-flavored products, and cheese products.

Dietary foods can be made with the reduced calorie fat compositions to meet special dietary needs, for example, of persons who are obese, diabetic, or hypercholesterolemic. The fat compositions can be a major part of a low-fat, low-calorie, low-cholesterol diet, and they can be used alone or in combination with drug therapy or other therapy. Combinations of food or beverage products made with the reduced calorie fat compositions can be used as part of a total dietary management regimen, based on one or more of these products, containing the fat compositions alone or in combination with one or more of the above-mentioned ingredients.

It is known that certain polyol fatty esters will inhibit the absorption of cholesterol. The present invention also encompasses methods for lowering serum cholesterol by inhibiting the absorption of cholesterol, comprising systemically (generally, orally) administering to animals susceptible to or afflicted with hypercholesterolemia successive therapeutically effective doses of the reduced calorie fat compositions of the foregoing type. Generally the dosage is about 0.1 gram to about 5 grams of the present fat compositions.

ANALYTICAL METHODS

The fatty acid composition can be measured by gas chromatography (see U.S. Pat. No. 4,960,600 col. 8). Ester distribution is measured by HPLC (high pressure liquid chromatography (see EPO 375239, Whelan et al., Jun. 27, 1990, page 9).

A. Turbidity Determination
 Equipment
  Hach Ratio/XR Turbidimeter, Model 43900, Manufactured by Hach Co., Loveland, Colo.
  25 mm sample cells (Hach catalog Number 20849-00)
  180 NTU formazin standard
 Calibration:
  Perform the following steps with the instrument in the fast response mode.
  With the instrument warmed up and the cell holder empty, place the light shield over the cell holder opening and select the 2 range. Adjust the front panel ZERO control for a reading of 0.000. Remove the rubber plug from the right side of the instrument case to gain access to the calibration controls. Select the 20-NTU range. Place a sample cell containing an 18-NTU formazin standard into the instrument with the index mark on the sample cell aligned with the raised mark on the spill ring. Cover it with the light shield. Using the calibration tool, adjust the 20-200 S (span) control to obtain a display of 18.00. Select the 200-NTU range. Place a sample cell with a 180-NTU formazin standard into the instrument, aligning the sample cell index mark with the mark on the spill ring. Cover it with the light shield. Use the calibration tool to adjust the 20-200 (linearity) control to obtain a display of 180.0. Adjustment of either of the span or linearity controls will affect the setting of the other. Repeat the steps until readings of 18.00 and 180.0 are achieved on each range, respectively. Select the 2000-NTU range. Place a sample cell with 180-NTU formazin standard into the instrument, aligning the sample cell index mark with the mark on the spill ring. Cover it with the light shield. Using the calibration tool, adjust the 2K range S (span) control to obtain a reading of 180.0 NTU. Place a sample cell with an 1800-NTU formazin standard into the instrument, aligning the sample cell index mark with the mark on the spill ring. Cover it with the light shield. Use the calibration tool to adjust the 2K range L (linearity) control to obtain a display of 1800. Again place the 180-NTU formazin standard into the instrument. If interaction with the linearity adjustment caused a change in the 180 reading, repeat these steps.

Measuring Turbidity:

The sample turbidity is measured as follows:

Verify that the power switch is turned on and that the instrument has had a 15-minute warm-up. Select 0-200 NTU range. Wait at least 15 seconds in each range to allow the instrument to stabilize. Select the lowest range possible without having an overrange condition. An overrange condition, sample turbidity higher than the top of the range, is evidenced by a flashing display of $-1.888$, $-18.88$, $-188.8$ or $-1888$, depending on the selected range. Fill a clean sample cell to the mark with deaerated test sample and place it into the cell holder. The sample cell must be clean, dry and free of fingerprints. Coat the sample cell with a thin coat of silicone oil to mask imperfections in the glass. Insert the sample in the instrument, aligning the cell index mark with the raised mark on the spill ring around the cell holder opening. Be sure the cell is down completely and held in place by the spring clip. Cover the sample with the light shield. Read the turbidity of the sample from the digital display. (Units are NTU).

B. Fluidity

Apparatus

Constant temperature box controlled at 70°±1° F.
Balance any with 0.1 gram accuracy.
Cup 4 oz. or equivalent.
Fluidometer (Saybolt cup with a Furol orifice mounted with an electric timing device to control flow for a 30 second interval.)

Sample Preparation

Sample is to be equilibrated 24 hours in constant temperature box at 70°±1° F.

Operation

1) Invert sample (turn 180 degrees and return to original position) 20 times or shake sample 10 times to thoroughly mix the sample.
2) Place toggle switch in automatic position.
3) Tare the paper cup on the balance and then place it under the Saybolt tube.
4) Fill the Saybolt cup with sample to overflow top edge of the inner tube.
5) Push start button. Timer controls the preparation until test is finished.
6) Weigh and record the amount of product in the cup.
7) Repeat steps 3 through 6 two more times.
8) Place the toggle switch in the manual position.
9) Hold start button down and remove excess sample from the Saybolt cup by pushing plunger down into cup.
10) Fluidity=grams/30 seconds as an average of three weights from step 6.

C. Yield Point

Apparatus:

Contraves Rheomat 115 manufactured by Contraves AG, Zurich, Switzerland, controlled rate rheometer with cone and place attachment.

Method:

Gap is set automatically. Calibrate torque meter to 0.0.

1) Measuring apparatus is allowed to equilibrate to a temperature of 70.0° F.±0.1° F.
2) Sample is applied to plate and cone is allowed to gently settle onto plate.
3) Run scan shown below:

| Curve 1 | |
| --- | --- |
| Sensitivity | 1.0 |
| First minimum shear rate (sec.$^{-1}$) | 0.000 |
| Time at minimum shear rate (sec.) | 120.0 |
| Ascending ramp time (sec.) | 60.0 |
| Maximum shear rate (sec.$^{-1}$) | 20.000 |
| Hold time (sec.) | 10.0 |
| Second minimum shear rate (sec.$^{-1}$) | 0.000 |
| Descending ramp time (sec.) | 60.0 |

4) At completion of test, instrument calculate yield point and thixotropic area using Casson-Steiger Model. The yield point is defined as the shear stress required to cause flow.

D. Complete Melt Point

Equipment:

Perkin-Elmer 7 Series Thermal Analysis System, Model DSC7, manufactured by Perkin-Elmer, Norwalk, Conn.

Procedure:

1) Sample is heated to at least 10° C. above the complete melting point and mixed thoroughly.
2) 10±2 mg. of sample is weighed into sample pan.
3) A scan is performed from about 10° C. above the complete melting point to $-60°$ C. at 5° C. per minute.
4) The temperature of the sample is maintained at $-60°$ C for 3 minutes and scanned from $-60°$ C. to the original starting temperature at 5° C. per minute (i.e. about 10° C. above the complete melting point).
5) The complete melting point is the temperature at the intersection of the baseline (specific heat line) with the line tangent to the trailing edge of the endothermic peak.

This invention has been illustrated by hydrophobic silica particles. Other hydrophobic materials having an average particle diameter of less than 50 nanometers also function as passive oil loss agents. Preferred materials are substituted celluloses, in particular, ethyl cellulose sold under the name Ethocel. The following examples illustrate the invention, but are not limiting thereof.

EXAMPLE 1

A clear salad or cooking oil is prepared by mixing the following ingredients:

| Ingredient | Wgt. Percent |
| --- | --- |
| Hydrophobic Silica (Aerosil R974; Degussa Corporation) | 1.75% |
| Liquid Sucrose Fatty Acid Polyester (Prepared by the methyl ester route from a soybean oil source. Iodine Value = 89.1) | 33.25% |
| Liquid Triglyceride Oil (Unhardened canola oil) | 65.00% |

The Aerosil R974 silica is made hydrophobic by methylating the silanol groups of fumes silica with dimethyl dichlorosilane, It has a particle size between 7 and 16 nanometers. Approximately 60% of the surface silanol groups are derivatized, The average particle diameter is 12 nanometers.

The liquid sucrose fatty acid polyester has the following composition:

| Fatty Acid Composition | Wgt. % | Ester Distribution | Wgt. % |
| --- | --- | --- | --- |
| C12 | — | Octa | 88.2 |
| C14 | — | Hepta | 11.8 |
| C16 | 9.1 | Hexa | <0.1 |
| C18 | 6.4 | Penta | <0.1 |
| C18:1 | 64.4 | Lower | <0.1 |
| C18:2 | 18.9 | | |
| C18:3 | 0.3 | | |
| C20 | 0.3 | | |
| C22 | 0.2 | | |
| Other | 0.4 | | |

The above ingredients are blended with a high shear mixer at approximately 80° C., The sample is then cooled to room temperature and may be deaerated to insure no air bubbles are trapped within the sample, Optical turbidity of the final product at room temperature (21° C.) is 8.4 NTU,

EXAMPLE 2

A clear salad or cooking oil is prepared by mixing the following ingredients:

| Ingredient | Wgt. Percent |
| --- | --- |
| Hydrophobic Silica (Aerosil R972; Degussa Corporation) | 2.00% |
| Liquid Sucrose Fatty Acid Polyester (Prepared by the methyl ester route from a soybean oil source. Iodine Value = 99.5) | 31.00% |
| Liquid Triglyceride Oil (Unhardened canola oil) | 67.00% |

The Aerosil R972 silica is made hydrophobic by methylating the silanol groups of fumed silica with dimethyl dichlorosilane, It has a particle size between 7 and 16 nanometers, Approximately 70% of the surface silanol groups are derivatized, The average particle diameter is 16 nanometers.

The liquid sucrose fatty acid polyester has the following composition:

| Fatty Acid Composition | Wgt. % | Ester Distribution | Wgt. % |
| --- | --- | --- | --- |
| C12 | — | Octa | 76.6 |
| C14 | — | Hepta | 22.9 |
| C16 | 10.6 | Hexa | 0.3 |
| C18 | 10.0 | Penta | 0.2 |
| C18:1 | 43.9 | Lower | <0.1 |
| C18:2 | 32.5 | | |
| C18:3 | 2.1 | | |
| C20 | 0.3 | | |
| C22 | 0.3 | | |
| Other | 0.3 | | |

The above ingredients are blended with a high shear mixer at approximately 80° C. The sample is then cooled to room temperature and may be deaerated to insure no air bubbles are trapped within the sample. Optical turbidity of the final product at room temperature (21° C.) is 15.9 NTU.

EXAMPLE 3

A clear salad or cooking oil is prepared by mixing the following ingredients:

| Ingredient | Wgt. Percent |
| --- | --- |
| Hydrophobic Silica (Aerosil R974; Degussa Corporation) | 1.05% |
| Liquid Sucrose Fatty Acid Polyester (Prepared by the methyl ester route from a soybean oil source. Iodine Value = 89.1) | 33.95% |
| Liquid Triglyceride Oil (Unhardened canola oil) | 65.00% |

The hydrophobic silica has a particle size between 7 and 16 nanometers. The liquid sucrose polyester used in this example are those according to Example 1. The above ingredients are blended with a high shear mixer at approximately 80° C. The sample is then cooled to room temperature and may be deaerated to insure no air bubbles are trapped within the sample. Optical turbidity of the final product at room temperature (21° C.) is 5.4 NTU.

EXAMPLE 4

A deep fat frying oil is prepared by mixing the following

| Ingredient | Wgt. Percent |
| --- | --- |
| Hydrophobic Silica (Aerosil R972; Degussa Corporation) | 3.00% |
| Liquid Sucrose Fatty Acid Polyester (Prepared by the methyl ester route from a soybean oil source. Iodine Value = 89.1) | 97.00% |

The Aerosil R972 silica has been made hydrophobic by methylating the silanol groups of fumed silica with dimethyl dichlorosilane. Approximately 70% of the surface silanol groups are derivatized. The average particle diameter is 16 nanometers.

The liquid sucrose fatty acid polyester is the same material used in Example 1. The above ingredients are blended with a high shear mixer at approximately 80° C. and then cooled to room temperature. The final oil blend is used to prepare fried potato chips. Sliced Norchip potatoes (thickness=0.052 inches) are fried in a 5 pound oil capacity batch fryer at a controlled temperature of 365° F. for 3 minutes, 20 seconds. After removal from the frying oil, the chips are allowed to drain and, if desired, may be treated to aid the fat drainage process (e.g. blowing hot air over the surface; steam stripping; etc.). The potato chips have a good taste and do not have a waxy impression.

EXAMPLE 5

| Ingredient | Wgt. Percent |
|---|---|
| Hydrophobic Silica | 1.80% |
| Solid Sucrose Fatty Acid Polyester (Prepared by the methyl ester route from refined, bleached sunflower oil and the distilled esters from hydrogenated, high-erucic acid rapeseed oil) | 2.30% |
| Liquid Sucrose Fatty Acid Polyester (Prepared by the methyl ester route from a soybean oil source. Iodine Value = 89.1 | 95.90% |

Aerosil R972 silica (from Degussa Corp.) is used. The silanol groups of fumed silica are methylated with dimethyl dichlorosilane. Approximately 70% of the surface silanol groups are derivatized. The average particle diameter is 16 nanometers.

The liquid sucrose fatty acid polyester is the same material used in Example 1. The solid sucrose polyester has the following composition:

| Fatty Acid Composition | Wgt. % | Ester Distribution | Wgt. % |
|---|---|---|---|
| C8 | 0.2 | Octa | 71.6 |
| C10 | — | Hepta | 28.2 |
| C12 | — | Hexa | 0.2 |
| C14 | — | Penta | <0.1 |
| C16 | 1.0 | Lower | <0.1 |
| C18 | 4.3 | | |
| C18:1 | 3.1 | | |
| C18:2 | 9.1 | | |
| C18:3 | 0.2 | | |
| C20 | 4.5 | | |
| C22 | 73.0 | | |
| C24 | 2.8 | | |
| Other | 1.8 | | |
| Iodine Value | 19.8 | | |

The above ingredients are blended with a high shear mixer at approximately 80° C. and then cooled to room temperature. The final oil blend is used to prepare fried potato chips. Sliced Norchip potatoes (thickness=0.052 inches) are fried in a 5 pound oil capacity batch fryer at a controlled temperature of 365° F. for 3 minutes, 20 seconds. After removal from the frying oil, the chips are allowed to drain and, if desired, may be treated to aid the fat drainage process (e.g. blowing hot air over the surface; steam stripping; etc.). The potato chips have a good taste and do not have a waxy impression.

EXAMPLE VI

An oil composed of 10% hydrophobic silica (Aerosil R972) and a sucrose polyester made from soybean oil fatty acids hydrogenated to an Iodine Value of 107 (predominantly hepta and octaesters) is fed to rats as part of their diet. Anal leakage was controlled to a level of 86%.

What is claimed is:

1. A nondigestible fat which comprises:
   1. a liquid nondigestible oil having a complete melting point below about 37° C; and
   2. a sufficient amount of a hydrophobic silica to control passive oil loss of the liquid nondigestible oil said silica having an average diameter of less than 50 nonometers.

2. A fat according to claim 1 comprising from 0.5% to about 15% hydrophobic silica and from 99.5% to about 85% liquid nondigestible oil.

3. A fat according to claim 2 comprising from 0.5 to about 10% hydrophobic silica.

4. A fat according to claim 3 wherein said hydrophobic silica has an average particle size of 7 to 40 nanometers.

5. A fat according to claim 3 wherein said hydrophobic silica is chemically modified by bonding an alkyl group having 1 to 8 carbon atoms or a cycloakyl group to the silica.

6. A fat according to claim 5 wherein the hydrophobic silica contains methyl groups.

7. A fat according to claim 3 wherein said liquid nondigestible oil is selected from the group consisting of polyol polyesters of fatty acids having from 8 to 22 carbon atoms.

8. A fat according to claim 7 wherein said polyol is selected from the group consisting of sucrose, erythritol, sorbitol, glucose and xylitol.

9. A reduced calorie fat composition which comprises from about 10 to 100% of the nondigestible fat of claim 1 and from 0 to about 90% of a digestible triglyceride fat or oil.

10. A composition according to claim 9 wherein said triglyceride is selected from the group consisting of palm oil, canola oil, soybean oil, cottonseed oil, hydrogenated soybean oil, corn oil, sunflowerseed oil and peanut oil.

11. A fat according to claim 10 wherein said hydrophobic silica contains methyl groups and is at least 50% substituted.

12. A low-moisture food having nonfat ingredients and containing the fat composition of claim 2.

13. A low-moisture food according to claim 12 wherein said food is selected from the group of potato snacks, corn chips, and tortilla chips.

14. A reduced calorie cooking and salad oil which is clear at about 71° F. (21.1° C.) or less and which is pourable at 21° C., wherein the fat composition comprises from about 10% to about 100% nondigestible fat component and from about 0% to about 90% digestible triglyceride fat or oil of from about 0.5% to about 15% hydrophobic silica having an average particle diameter of less than 50 nanometers.

15. A salad oil according to claim 14 wherein said hydrophobic silica is selected from the group of $C_1$ to $C_8$ alkyl and cycloakyl silicas.

16. A salad oil according to claim 15 wherein said alkyl group is methyl and wherein the silica is at least 50% substituted.

17. A salad oil according to claim 16 wherein said nondigestible fat component comprises from 35% to 100% of said composition.

18. A salad oil according to claim 17 which has a yield point of 100 dynes/cm$^2$ or less and an optical turbidity of 200 NTU or less.

19. A salad oil according to claim 18 wherein said nondigestible oil is selected from the group consisting of polyol polyesters of fatty acids having from 8 to 22 carbon atoms.

20. A salad oil according to claim 19 wherein said polyol is selected from the group consisting of sucrose, glucose, erythritol, xylitol and sorbitol.

21. A salad oil according to claim 20 wherein said polyol polyester is a sucrose polyester esterified with at least 6 fatty acids selected from the group consisting of fatty acids of soybean oil, canola oil, cottonseed oil, corn oil, peanut oil, palm kernel oil and coconut oil.

22. A salad oil according to claim 21 wherein said silica has a particle size of 7 to 40 nanometers and is at 1 east 50% substituted with methyl groups.

23. A salad oil according to claim 22 wherein said triglyceride oil is selected from the group consisting of corn oil, cottonseed oil, peanut oil, soybean oil, canola oil, low erucic acid rapeseed oil, sunflowerseed oil, sesame seed oil, safflower oil, palm kernel oil, coconut oil and mixtures thereof.

24. A reduced calorie fat composition comprising:
(a) from about 0.5% to about 15% hydrophobic silica having an average particle diameter of less than 50 nanometers:;
(b) from about 0.5% to about 10% solid polyol polyester or triglyceride; and
(c) from about 75% to about 99% liquid polyol polyester.

25. A fat composition according to claim 24 wherein the hydrophobic silica has a surface area in the range of from about 50 to about 380 $m^2/g$.

26. A fat composition according to claim 25 wherein the hydrophobic silica is substituted with an organic radical selected from the group of ethyl, methyl and octyl.

27. A fat composition according to claim 26 wherein said liquid polyol ester is a hexa-, hepta- or octa substituted polyester of sucrose and oleic acid, linoleic acid, stearic, palmitic, behenic acid and mixtures thereof.

28. A fat composition according to claim 26 wherein said solid polyol polyester is selected from the group of sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or di-unsaturated fatty acid radicals and behenic fatty acid radicals in a molar ratio of unsaturated:behenic acid radicals of about 1:7 to 3:5.

29. A potato chip fried in the fat composition of claim 24.

30. A potato chip fried in the fat composition of claim 28.

31. A nondigestible fat which comprises:
1. a liquid nondigestible oil having a complete melting point below about 37° C.; and
2. a sufficient amount of a hydrophobic material to control passive oil loss of the liquid nondigestible oil, said hydrophobic material having an average diameter of less than 50 nanometers.

32. A low moisture food according to claim 13 wherein said potato snack is a potato chip.

* * * * *